(12) United States Patent
Kusano

(10) Patent No.: US 7,354,116 B2
(45) Date of Patent: *Apr. 8, 2008

(54) VEHICLE BRAKE HYDRAULIC PRESSURE GENERATOR

(75) Inventor: Akihito Kusano, Asahi-machi (JP)

(73) Assignee: Advics Co., Ltd., Kariya, Aichi (JP)

( * ) Notice: Subject to any disclaimer, the term of this patent is extended or adjusted under 35 U.S.C. 154(b) by 64 days.

This patent is subject to a terminal disclaimer.

(21) Appl. No.: 10/374,970

(22) Filed: Feb. 28, 2003

(65) Prior Publication Data

US 2003/0214179 A1  Nov. 20, 2003

(30) Foreign Application Priority Data

Feb. 28, 2002  (JP)  ............................. 2002-053598

(51) Int. Cl.
*B60T 8/34*  (2006.01)

(52) U.S. Cl. ..................... 303/113.4; 303/122; 60/553; 91/434

(58) Field of Classification Search ............. 303/113.4, 303/115.1, 117.1, 122, 122.09, 122.13; 188/355, 188/358, 359; 60/547.1, 554, 579, 582, 548, 60/553; 91/434
See application file for complete search history.

(56) References Cited

U.S. PATENT DOCUMENTS

| | | | |
|---|---|---|---|
| 3,946,564 A * | 3/1976 | Nakagawa ................... | 60/548 |
| 4,126,996 A | 11/1978 | Leiber | |
| 4,724,674 A | 2/1988 | Fulmer | |
| 4,741,161 A * | 5/1988 | Belart et al. ............... | 60/547.1 |
| 5,720,170 A * | 2/1998 | Hageman et al. .............. | 60/562 |
| 5,729,979 A * | 3/1998 | Shaw et al. ................... | 60/533 |
| 6,052,994 A | 4/2000 | Oishi et al. | |
| 6,089,676 A | 7/2000 | Nishii et al. | |
| 6,311,492 B1 * | 11/2001 | Takayama et al. ............ | 60/562 |

(Continued)

FOREIGN PATENT DOCUMENTS

DE  26 07 140 A1  8/1977

(Continued)

OTHER PUBLICATIONS

English Language Translation of German Patent Office Examination Report dated May 6, 2004.

(Continued)

*Primary Examiner*—Melody M. Burch
(74) *Attorney, Agent, or Firm*—Buchanan Ingersoll & Rooney PC

(57) ABSTRACT

In a brake hydraulic pressure generating device in which the brake operating force is applied to a pressure adjusting valve through a stroke simulator and the hydraulic pressure supplied from the hydraulic pressure source is adjusted to a value corresponding to the brake operating force, during return of the brakes, the return stroke before the brake hydraulic pressure begins to drop is large, so that the brake feeling is bad. This invention proposes a solution to this problem. Hysteresis is imparted to the stroke simulator so that the output hydraulic pressure of the pressure adjusting valve for the stroke of the simulator piston stroke during increase of the brake operating force will be higher than that during reduction of the brake operating force by setting the sliding resistance of the simulator piston greater than that of the input piston.

9 Claims, 4 Drawing Sheets

U.S. PATENT DOCUMENTS 6,857,336 B2 * 2/2005 Staker .................. 74/513

FOREIGN PATENT DOCUMENTS

| DE | 198 29 048 C2 | 1/1999 |
| DE | 198 29 051 C2 | 4/1999 |
| EP | 1078833 A2 | 2/2001 |
| JP | 61-37140 B2 | 8/1986 |
| JP | 62-103251 | 5/1987 |
| JP | 10-129460 | 5/1998 |
| JP | 11-105699 | 4/1999 |
| JP | 2002-37052 A * | 2/2002 |

OTHER PUBLICATIONS

English Language Translation of Japan Patent Office Examination Report dated Jun. 27, 2006.

* cited by examiner

VEHICLE BRAKE HYDRAULIC PRESSURE GENERATOR

BACKGROUND OF THE INVENTION

This invention relates to a vehicle brake hydraulic pressure generator which adjusts the hydraulic pressure supplied from a hydraulic pressure source including a power-driven pump to a value corresponding to a brake operating force by means of a pressure adjusting valve and outputs it.

A brake hydraulic pressure generator of this type is disclosed in JP patent publication 61-37140.

With the device of this publication, the brake operating force from a brake pedal is applied to an operating rod inserted in a booster piston, and transmitted to an input rod in the booster piston through a stroke limiting spring. The input rod closes an outlet valve and opens an input valve to adjust the hydraulic pressure supplied into a pressure accumulating chamber upstream of the booster piston from the pump and output it.

The output hydraulic pressure of the pressure adjusting valve is supplied not only to a first hydraulic line as the brake hydraulic pressure, but also to the master cylinder. By this hydraulic pressure, the master cylinder is activated, so that brake hydraulic pressure is generated in the second hydraulic line, which is independent of the first hydraulic line. The operating rod in this publication corresponds to the simulator piston of the present application, the stroke limiting spring to the elastic member, the pressure release chamber to the simulator chamber, and the supplementing chamber to the atmospheric reservoir.

With the brake hydraulic pressure generator using a booster of this publication, in order to reduce the brake hydraulic pressure during return of the brake, in addition to a stroke for opening the pressure-reducing port (outlet valve) of the pressure adjusting valve, a stroke for returning the stroke-limiting spring to a point corresponding to the output hydraulic pressure of the pressure adjusting valve, which is being reduced, is needed, it is necessary that the brake operating member makes a large stroke. Thus the brake feeling is bad.

An object of this invention is to improve the brake feeling during return of the brakes by making it possible to begin reducing the brake hydraulic pressure (i.e. braking force) with a short return stroke.

SUMMARY OF THE INVENTION

According to this invention, there is provided a vehicle brake hydraulic pressure generating device comprising a hydraulic pressure source for generating a predetermined hydraulic pressure, a stroke simulator comprising a simulator piston operatively coupled with a brake operating member and an elastic member for imparting a stroke corresponding to the brake operating force to the simulator piston, an input piston having the simulator piston therein for receiving the brake operating force from the simulator piston through the elastic member, and a pressure adjusting valve which activates according to the displacement of the input piston to adjust the hydraulic pressure supplied from the hydraulic pressure source to a value corresponding to the brake operating force, characterized in that the hysteresis of the stroke simulator is set such that the output hydraulic pressure of the pressure adjusting valve for the stroke of the simulator piston while the brake operating force is increasing will be higher than the output hydraulic pressure of the pressure adjusting valve for the stroke of the simulator piston while the brake operating force is decreasing.

By creating the hysteresis of the stroke simulator with the slide resistance of the simulator piston so that its slide resistance will be greater than that of the input piston, it is possible to set the output hydraulic pressures of the pressure adjusting valve during increase and decrease of the brake operating force as described above. In this case, if setting of the slide resistance of the simulator piston so as to be greater than that of the input piston is done by making the hardness or interference of the first sealing member for sealing the outer periphery of the simulator piston different from the hardness or interference of the second sealing member for sealing the outer periphery of the input piston, hysteresis can be easily set and adjusted.

It is also possible to form the elastic member from rubber and create the hysteresis of the stroke simulator with the hysteresis of the rubber. This structure also facilitates setting of hysteresis.

In the arrangement in which hysteresis of the stroke simulator is created by use of the slide resistance of the simulator piston to create a difference in sliding resistance between the simulator piston and the input piston, an input piston is essential which moves to a position corresponding to the brake operating force and activates the pressure adjusting valve. But in the arrangement which activates the pressure adjusting valve by transmitting the brake operating force from the simulator piston to the pressure adjusting valve through the elastic member, no input piston is needed. The arrangement in which the elastic member is formed of rubber to create hysteresis of the stroke simulator with the hysteresis of the rubber is also applicable to an arrangement having no input piston.

In a brake hydraulic pressure generator in which hydraulic pressure supplied from the hydraulic pressure source is adjusted to a value corresponding to the brake operating force by means of a pressure adjusting valve, as a provision against an emergency, a master cylinder for supplying the brake hydraulic pressure is provided in one of two hydraulic lines so that while the device is normal, the master cylinder is activated by the output hydraulic pressure of the pressure adjusting valve, and if the hydraulic pressure source or the other hydraulic line fails, the brake operating force is directly transmitted to the master cylinder to activate the master cylinder with the brake operating force.

In such a device having a master cylinder, it is necessary to additionally reduce the output hydraulic pressure of the pressure adjusting valve by an amount corresponding to the slide resistance of the master piston during return of the brakes. But increase in the return stroke due to excessive pressure reduction will not occur if the hysteresis of the stroke simulator is so set that the output hydraulic pressure of the master cylinder relative to the simulator piston stroke while the brake operating force is increasing is higher than the output hydraulic pressure of the master cylinder relative to the simulator piston stroke while the brake operating force is decreasing so that pressure will be reduced by an amount corresponding to the slide resistance of the master piston.

With the device having an input piston, when the brake operating force is relaxed, due to hysteresis imparted to the stroke simulator, the input piston begins to move relative to the pressure adjusting piston before the simulator piston begins to move relative to the input piston.

In the arrangement in which the pressure adjusting valve is activated by transmitting the brake operating force from the simulator piston to the pressure adjusting valve through an elastic member, when the brake operating force is relaxed, the valve body of the pressure adjusting valve returns following the simulator piston without delay. Thus in either of the arrangements, the return stroke before the brake hydraulic pressure begins to decrease will be sufficient if it is enough to open the pressure reducing port of the pressure adjusting valve. Thus it is possible to reduce the brake hydraulic pressure without causing the brake operating member to make a large stroke.

These devices may be provided with a master cylinder activated by the output hydraulic pressure of the pressure adjusting valve. The device having a master cylinder exhibits the effects of this invention more remarkably.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENT

The embodiments of this invention will be described with reference to FIGS. 1-3.

Figure 1:
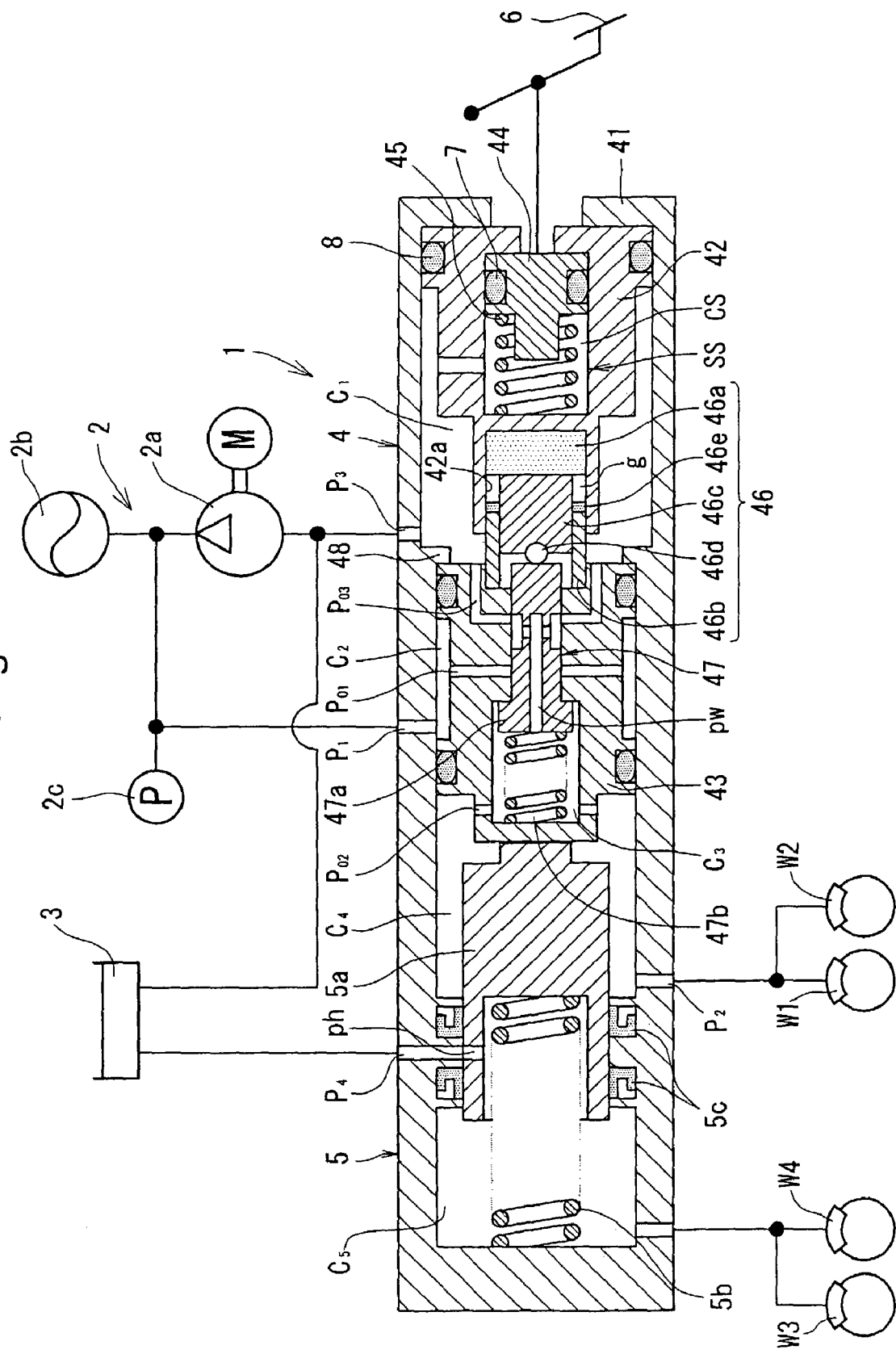
FIG. 1 is a sectional view schematically showing an embodiment of the brake hydraulic pressure generator.

The brake hydraulic pressure generator shown in FIG. 1 comprises a hydraulic pressure source 2, an atmospheric reservoir 3, and a pressure adjusting device 4 integrally formed with a master cylinder 5.

The hydraulic pressure source 2 includes a power pump 2a, a pressure accumulator 2b and a pressure sensor 2c. When the hydraulic pressure detected by the pressure sensor 2c reaches a preset lower limit, a command is given from a control device (not shown) that receives signals from the pressure sensor 2c, to activate the pump 2a. When the detected hydraulic pressure reaches a preset upper limit, the pump 2a will stop. Thus, in a normal state, a hydraulic pressure within a predetermined range is always stored in the hydraulic pressure source 2, and the hydraulic pressure is supplied to the pressure adjusting device 4 when the brake is operated.

The atmospheric reservoir 3 is connected to the intake side of the pump 2a, a fluid chamber $C_1$ in the pressure adjusting device 4 and the master cylinder 5.

The pressure adjusting device 4 includes a housing 41, an input piston 42 mounted in the housing 41 with its tip protruding into the fluid chamber $C_1$, an auxiliary piston 43 arranged in front of the input piston 42, a simulator piston 44 provided in the input piston 42 with its front portion in a simulator chamber CS, an elastic member 45 (a coil spring in the figure but a rubber or an air spring may be used singly or in combination) for imparting a stroke corresponding to the brake operating force applied from a brake operating member (a brake pedal 6 in the figure) to the simulator piston 44, a distributor 46 for splitting the brake operating force transmitted from the simulator piston 44 to the input piston 42 through the elastic member 45 and transmitting it to the below-described pressure adjusting valve and an auxiliary piston 43, and a pressure adjusting valve 47 for adjusting the brake hydraulic pressure supplied from the hydraulic pressure source 2 to a value corresponding to the brake operating force. The simulator piston 44, elastic member 45 and simulator chamber CS, which communicates with the fluid chamber $C_1$ through a hole formed through the input piston 42, form a stroke simulator.

The distributor 46 includes a rubber member 46a provided in an annular recess 42a formed in the tip of the input piston 42, a tubular member 46b having its one end abutting the auxiliary piston 43 and the other end inserted in the annular recess 42a, and a transmitting member 46c and a steel ball 46d mounted in the tubular member 46b and disposed between the rubber member 46a and the pressure adjusting valve 47. A gap g is provided between the rubber member 46a and an annular resin plate 46e mounted at the end of the tubular member 46b for protecting the rubber member 46a.

By providing the distributor 46, in the initial stage of brake operation, the brake operating force is transmitted only to the pressure adjusting valve 47 through the rubber member 46a, the transmitting member 46c and the steel ball 46d. When the brake operating force exceeds a certain value, the rubber member 46a, which has been resiliently deformed to get into the gap g, comes into contact with the annular plate 46e. Thereafter, part of the brake operating force is distributed through the tubular member 46b to the auxiliary piston 43 as well.

Thus, this function makes it possible to impart jumping property, which makes sharp the initial buildup of the brake hydraulic pressure adjusted by the pressure adjusting valve 47, to the brake hydraulic pressure generator. Further, if the inner diameter of the tubular member 46b and the outer diameter of the transmitting member 46c change, the distribution ratio of the brake operating forces transmitted to the pressure adjusting valve 47 and the auxiliary piston 43 changes. Further, with changes in the lengths of these members, the distribution start timing changes. Thus, by replacing the tubular member 46b and the transmitting member 46c with ones having different sizes, it is possible to change the relation between the brake operating force and the output hydraulic pressure of the pressure adjusting valve.

In this regard, the provision of the distributor 46 is preferable. But it is possible to omit it and directly transmit the force from the input piston 42 to the pressure adjusting valve 47.

The pressure adjusting valve 47 shown is of a type in which pressure increase, decrease and hold are changed over by a spool 47a.

The auxiliary piston 43 has an input port $P_{01}$, output port $P_{02}$ and a pressure reducing port $P_{03}$. Changeover of connection between these ports and the adjustment of the degree of opening of the valve portions are carried out by displacing the spool 47a.

The input port $P_{01}$ normally communicates with the hydraulic pressure source 2 through an annular input chamber $C_2$ provided around the auxiliary piston 43, and an input port $P_1$ provided in the housing 41. The pressure reducing port $P_{03}$ normally communicates with the atmospheric reservoir 3 through a fluid chamber $C_1$ and a drain port $P_3$ provided in the housing 41. The output port $P_{02}$ is disposed between a fluid chamber $C_3$ in the auxiliary piston 43 and a fluid chamber $C_4$ in which the front portion of the auxiliary piston 43 is disposed, and an internal passage pw provided in the spool 47a communicates with an output port $P_2$ provided in the housing 41.

In the pressure adjusting valve 47 thus structured, when the spool 47a is pushed back by a return spring 47b to the illustrated original position in FIG. 1, the internal passage pw in the spool 47a is connected to the pressure reducing port $P_{03}$ so as to be in the pressure-reduced state. When the spool 47a is pushed in leftwardly in FIG. 1 from this position, the internal passage pw will be separated from both the pressure reducing port $P_{03}$ and the input port $P_{01}$ so as to be in the output holding state. When the spool 47a is further pushed in from this position, the internal passage pw is connected to the input port $P_{01}$, so that the hydraulic pressure supplied from the hydraulic pressure source 2 flows into the fluid chamber $C_4$. Thus, the wheel cylinders W1 and W2 in the right-hand line in FIG. 1 (hereinafter called a first hydraulic pressure line) will be in a pressure-increased state.

The spool 47a moves to a point where the sum of the thrust by the hydraulic pressure introduced into the fluid chamber $C_3$ and the force of the return spring 47b, balances with the brake operating force applied through the input piston 42. Thus, adjustment is made of the degree of opening of a valve portion formed between the input port $P_{01}$ and the shoulder of the spool 47a when the internal passage pw is connected to the input port $P_{01}$, and the degree of opening of a valve portion formed between the pressure reducing port $P_{03}$ and the shoulder of the spool 47a when the internal passage pw is connected to the pressure reducing port $P_{03}$, so that the brake hydraulic pressure outputted from the output port $P_{02}$ will be adjusted to a value corresponding to the brake operating force.

When hydraulic pressure is introduced into the fluid chamber $C_4$, the auxiliary piston 43 is pressed against a stopper 48 in the housing 41 by the hydraulic pressure. Thus, while the hydraulic pressure source 2 and the first hydraulic pressure line are normally operating, the auxiliary piston 43 will be held in the illustrated position.

The master cylinder 5 comprises a master piston 5a having its front portion disposed in a master chamber $C_5$ and its rear portion in a fluid chamber $C_4$, a return spring 5b for the master piston, and two sets of cup seals 5c liquid-tightly sealing the outer periphery of the master piston 5a.

When the output hydraulic pressure is introduced into the fluid chamber $C_4$ through the pressure adjusting valve 47, the master piston 5a moves toward the master chamber $C_5$ under the pressure. In the initial stage of this movement, a hole ph formed in the master piston 5a is separated from a port $P_4$ communicating with the atmospheric reservoir 3. Thereafter, a fluid pressure substantially equal to the pressure in the fluid chamber $C_4$ is produced in the master chamber $C_5$, and is supplied to the wheel cylinders W3 and W4 in the second hydraulic line.

The master cylinder 5 is provided as fail-safe measures if the hydraulic pressure source 2 or the first hydraulic line should fail. That is, if hydraulic pressure should not be produced in the fluid chamber $C_4$ due to a failure of the hydraulic pressure source 2, the auxiliary piston 43 is moved by the brake operating force applied through the input piston 42 and the brake operating force is directly transmitted to the master piston 5a through the auxiliary piston 43. Thus, hydraulic pressure proportional to the brake operating force is outputted from the master cylinder 5 to the wheel cylinders W3 and W4 in the second hydraulic line. This avoids so-called no braking in which brakes will not work.

With the brake hydraulic pressure generator of FIG. 1, on the outer periphery of the simulator piston 44, a first rubber seal member 7 is provided to liquid-tightly seal between the input piston 42 and the outer periphery of the simulator piston 44, and on the outer periphery of the input piston 42, a second rubber seal member 8 is provided to liquid-tightly seal between the input piston 42 and the housing 41. Either by setting the hardness of the first seal member 7 higher than that of the second seal member 8, or by setting the interference of the first seal member 7 greater than that of the second seal member 8, the slide resistance of the simulator piston 44 is set to be greater than that of the input piston 42.

Figure 4:
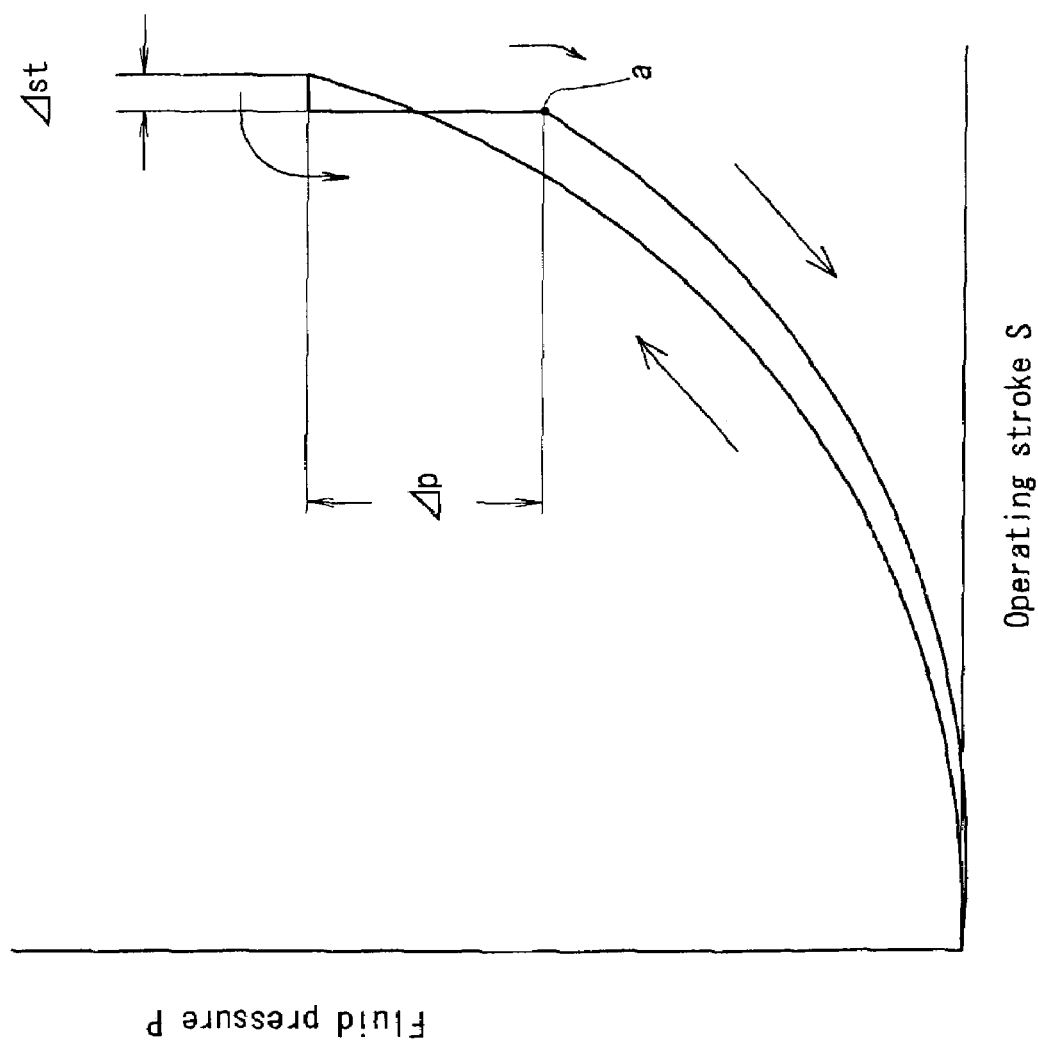
FIG. 4 is a graph showing the relation between the output hydraulic pressure and the stroke of the simulator piston.

Due to the difference in slide resistance, as shown in FIG. 4, the output hydraulic pressure of the pressure adjusting valve 47 relative to the simulator piston stroke while the brake operating force is increasing (during pressure rise) is set to be higher than that of the pressure adjusting valve 47 relative to the simulator piston stroke while the brake operating force is decreasing.

Since the slide resistance of the simulator piston 44 is greater than that of the input piston 42, no relative movement will occur between the input piston 42 and the simulator piston 44 until the stroke returns by $\Delta$ st, and the pressure reducing port of the pressure adjusting valve 47 will open only with a stroke $\Delta$ st, so that the brake hydraulic pressure will drop by $\Delta$ P. This improves the brake feeling. Relative movement of the simulator piston 44 relative to the input piston 42 begins at point a in FIG. 4.

Figure 2:
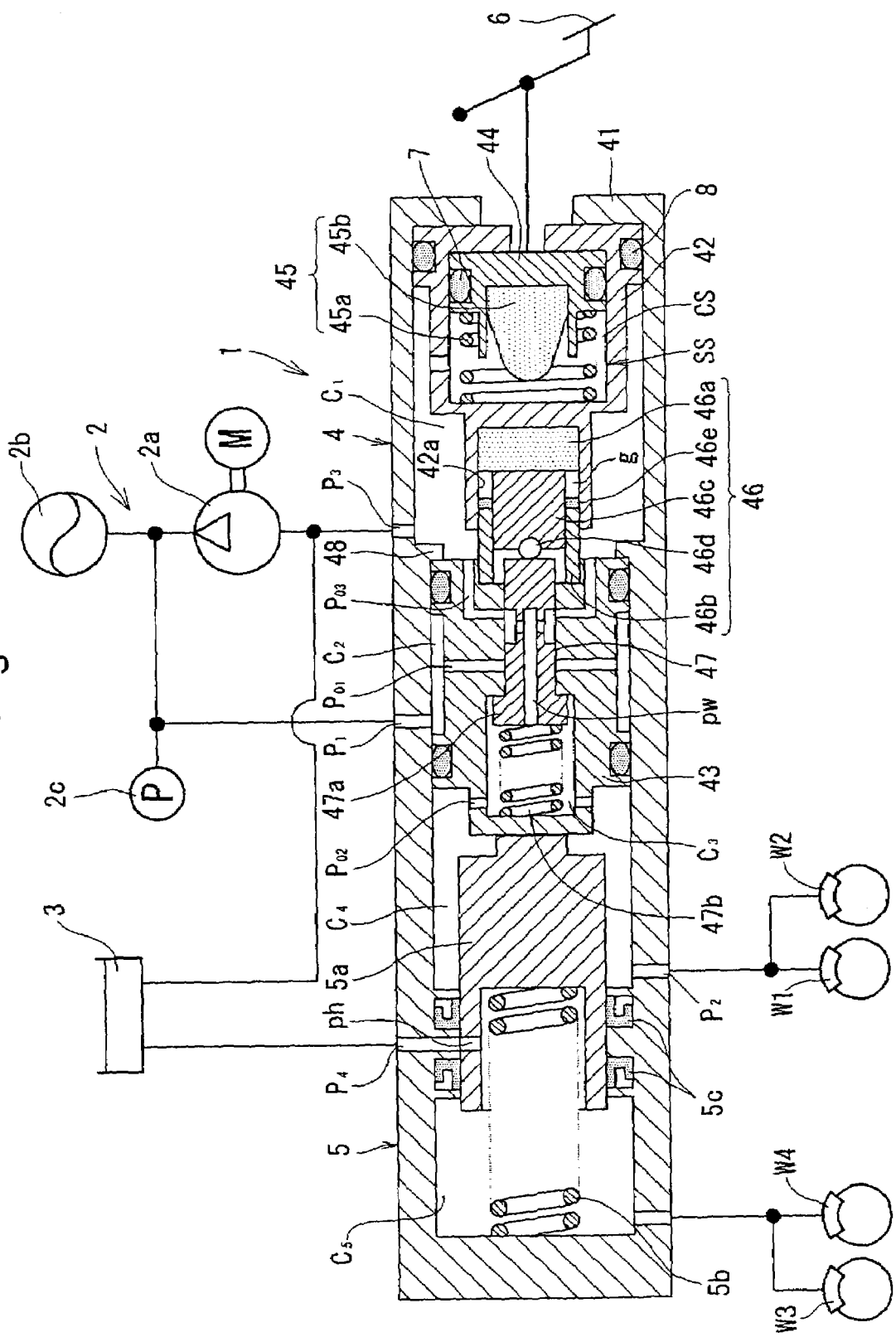
FIG. 2 is a sectional view of another embodiment.

With the brake hydraulic pressure generator of FIG. 2, the elastic member 45 of the stroke simulator SS is formed of a coil spring 45a and a rubber member 45b. In this embodiment, too, with the same method as described before, the slide resistance of the simulator piston 44 is set to be larger than that of the input piston 42. Thus the same function and effects as with the embodiment of FIG. 1 are obtained. Since other structures are the same as with the embodiment of FIG. 1, the same numerals are attached to the same elements and description is omitted.

In the embodiment of FIG. 2, it is also possible to create hysteresis of the stroke simulator SS not utilizing the slide resistance of the simulator piston but with the hysteresis of the rubber member 45b.

In the arrangement using hysteresis of the rubber member 45b, by arranging such that when the simulator piston 44 is in its initial position, the tip of the rubber member 45b contacts the input piston 42, it is possible to omit the coil spring 45a.

Figure 3:
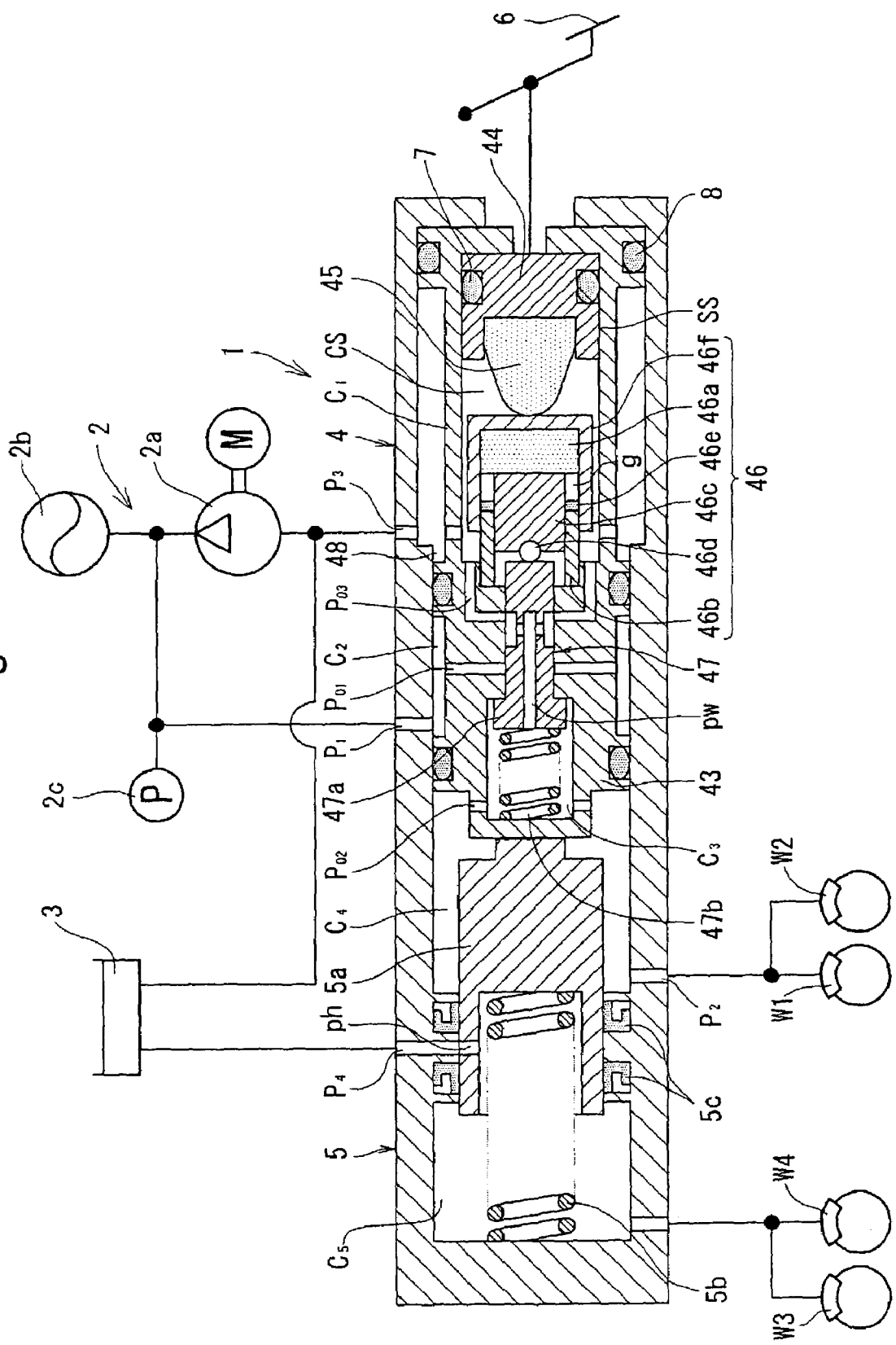
FIG. 3 is a sectional view of a still another embodiment.

FIG. 3 shows another embodiment in which the brake operating force is transmitted from the simulator piston 44 to the pressure adjusting valve 47 through the elastic member 45 to activate the pressure adjusting valve 47.

With this brake hydraulic pressure generator 1, the input piston 42 of FIG. 1 is omitted, and instead, an auxiliary piston 43, which is held in its initial position by the output hydraulic pressure of the pressure adjusting valve 47 while the hydraulic pressure source 2 is normal, is extended to a position where it is held by the housing 41, and the simulator piston 44 is inserted in the auxiliary piston 43. Also, the elastic member 45 is formed of rubber and its tip is brought into contact with the distributor 46. Further, the distributor 46 has the rubber member 46a inserted in a movable member 46f in the shape of a cylinder having a bottom. The embodiment of FIG. 3 differs from that of FIG. 1 in the abovementioned points.

The embodiment of FIG. 3 has no input piston, so that it is impossible to set hysteresis of the stroke simulator SS by use of the slide resistance of the simulator piston 44. Thus, hysteresis of the stroke simulator, which characterizes the present invention, is created by the hysteresis of the rubber forming the elastic member 45.

While any of the illustrated embodiments is provided with the master cylinder 5, this invention is applicable to a device having no master cylinder.

As described above, according to this invention, because the pressure reducing port of the pressure adjusting valve is opened by the hysteresis of the stroke simulator while the brake operating force is decreasing, at a position where the simulator piston has returned a little, it is possible to reduce the brake hydraulic pressure without requiring a large stroke of the brake operating member. Thus the brake feeling during return of the brake improves.

With a brake hydraulic pressure generator having a master cylinder, the return response of the master piston improves because the output hydraulic pressure of the pressure adjusting valve drops before the return stroke increases, so that the output hydraulic pressure of the master cylinder also drops. Thus, if this invention is applied to a brake hydraulic pressure generator provided with a master cylinder in which it is necessary to further reduce the output hydraulic pressure of the pressure adjusting valve by an amount corresponding to the slide resistance of the master piston, better effects can be expected.

What is claimed is:

1. A vehicle brake hydraulic pressure generating device comprising
    a hydraulic pressure source for generating a predetermined hydraulic pressure,
    a stroke simulator comprising a simulator piston operatively coupled with a brake operating member and an elastic member for imparting a stroke corresponding to a brake operating force to said simulator piston,
    an input piston having said simulator piston therein and displaceable under the brake operating force transmitted thereto from said simulator piston through said elastic member,
    a pressure adjusting valve displaceable under a pushing force transmitted from said input piston when said input piston is displaced under the brake operating force to adjust the hydraulic pressure supplied from said hydraulic pressure source to a value corresponding to the brake operating force,
    an auxiliary piston in which said pressure adjusting valve is received,
    a master cylinder defined forwardly of said auxiliary piston and activated by the output hydraulic pressure of said pressure adjusting valve, and
    a housing in which said stroke simulator, said input piston and said auxiliary piston are received, wherein the hysteresis of said stroke simulator while said hydraulic pressure source is functioning normally is set such that the output hydraulic pressure of said master cylinder for the stroke of said simulator piston while the brake operating force is increasing is higher than the output hydraulic pressure of said master cylinder for the stroke of said simulator piston while the brake operating force is decreasing.

2. A vehicle brake hydraulic pressure generating device as claimed in claim 1 wherein the hysteresis of said stroke simulator is created by the slide resistance of said simulator piston, and that the slide resistance of said simulator piston is greater than that of said input piston.

3. A vehicle brake hydraulic pressure generating device as claimed in claim 1 wherein said elastic member is formed of rubber and the hysteresis of said stroke simulator is created with the hysteresis of said elastic member.

4. A vehicle brake hydraulic pressure generating device as claimed in claim 3, wherein said elastic member is disposed between said simulator piston and said input piston, the device further comprising a rubber member disposed between said input piston and said pressure adjusting valve for transmitting part of the brake operating force to said auxiliary piston therethrough if the brake operating force exceeds a predetermined value.

5. A vehicle brake hydraulic pressure generating device as claimed in claim 1, wherein said input piston is displaceable relative to said housing under the brake operating force while said hydraulic pressure source is functioning normally, and said auxiliary piston is configured to be immovable relative to said housing while said hydraulic pressure source is functioning normally.

6. A vehicle brake hydraulic pressure generating device comprising
    a hydraulic pressure source for generating a predetermined hydraulic pressure,
    a stroke simulator comprising a simulator piston operatively coupled with a brake operating member and an elastic member for imparting a stroke corresponding to a brake operating force to said simulator piston,
    a pressure adjusting valve which is displaceable under the brake operating force transmitted thereto from said simulator piston through said elastic member to adjust the hydraulic pressure supplied from said hydraulic pressure source to a value corresponding to the brake operating force,
    an auxiliary piston in which said pressure adjusting valve is received,
    a master cylinder defined forwardly of said auxiliary piston and activated by the output hydraulic pressure of said pressure adjusting valve, and
    a housing in which said stroke simulator and said auxiliary piston are received, wherein
    the hysteresis of said stroke simulator is set such that the output hydraulic pressure of said master cylinder for the stroke of said simulator piston while the brake operating force is increasing is higher than the output hydraulic pressure of said master cylinder for the stroke of said simulator piston while the brake operating force is decreasing,
    said elastic member is formed of rubber and the hysteresis of said stroke simulator is created with the hysteresis of said elastic member.

7. A vehicle brake hydraulic pressure generating device as claimed in claim 6, wherein said simulator piston is received in said auxiliary piston, and said device further comprises a movable member, said elastic member being disposed between said simulator piston and said movable member, and a rubber member disposed between said movable member and said pressure adjusting valve for transmitting part of the brake operating force to said auxiliary piston therethrough if the brake operating force exceeds a predetermined value.

8. A vehicle brake hydraulic pressure generating device as claimed in claim 6, wherein said auxiliary piston is configured to be immovable relative to the housing while said hydraulic pressure source is functioning normally.

9. A vehicle brake hydraulic pressure generating device comprising
    a hydraulic pressure source for generating a predetermined hydraulic pressure,
    a stroke simulator comprising a simulator piston operatively coupled with a brake operating member and an elastic member for imparting a stroke corresponding to a brake operating force to said simulator piston,
    an input piston having said simulator piston therein for receiving the brake operating force from said simulator piston through said elastic member,
    a pressure adjusting valve which activates according to the displacement of said input piston to adjust the hydraulic pressure supplied from said hydraulic pressure source to a value corresponding to the brake operating force, an auxiliary piston in which said pressure adjusting valve is received, said auxiliary piston being configured to be immovable while said hydraulic pressure source is functioning normally, a master cylinder defined forwardly of said auxiliary piston and activated by the output hydraulic pressure of said pressure adjusting valve, and a housing in which said stroke simulator, said input piston and said auxiliary piston are received, characterized in that the hysteresis of said stroke simulator while said hydraulic pressure is functioning normally is set such that the output hydraulic pressure of said master cylinder for the stroke of said simulator piston while the brake operating force is increasing will be higher than the output hydraulic pressure of said master cylinder for the stroke of said simulator piston while the brake operating force is decreasing;

wherein the hysteresis of said stroke simulator is created by the slide resistance of said simulator piston, and that the slide resistance of said simulator piston is greater than that of said input piston; and wherein a first sealing member for sealing the outer periphery of said simulator piston has a different hardness or interference from the hardness or interference of a second sealing member for sealing the outer periphery of said input piston so that the slide resistance of said simulator piston is greater than that of said input piston.

* * * * *